(12) United States Patent
Ono et al.

(10) Patent No.: US 9,437,882 B2
(45) Date of Patent: *Sep. 6, 2016

(54) HOLDING APPARATUS FOR FUEL CELL GASKET

(71) Applicant: NISSAN MOTOR CO., LTD., Yokohama-shi, Kanagawa (JP)

(72) Inventors: Kei Ono, Yokohama (JP); Masaya Yamamoto, Yokosuka (JP); Kenichi Toyoshima, Yokohama (JP); Norifumi Horibe, Fujisawa (JP); Takayuki Terasaki, Yokohama (JP)

(73) Assignee: Nissan Motor Co., Ltd., Yokohama-Shi, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/413,103

(22) PCT Filed: Jun. 24, 2013

(86) PCT No.: PCT/JP2013/067274
§ 371 (c)(1),
(2) Date: Jan. 6, 2015

(87) PCT Pub. No.: WO2014/010397
PCT Pub. Date: Jan. 16, 2014

(65) Prior Publication Data
US 2015/0200406 A1 Jul. 16, 2015

(30) Foreign Application Priority Data

Jul. 10, 2012 (JP) .............................. 2012-154955

(51) Int. Cl.
*H01M 8/02* (2016.01)
*B25B 11/00* (2006.01)
*B25B 27/00* (2006.01)
(Continued)

(52) U.S. Cl.
CPC .......... *H01M 8/0273* (2013.01); *B25B 11/007* (2013.01); *B25B 27/0028* (2013.01); *H01M 8/006* (2013.01); *H01M 8/0276* (2013.01);
(Continued)

(58) Field of Classification Search
CPC ............ B25J 15/0616; B25B 27/0028; B25B 11/007; H01M 8/0273; H01M 8/0276
See application file for complete search history.

(56) References Cited

U.S. PATENT DOCUMENTS 3,467,430 A * 9/1969 Lowe ................... B65G 49/061
294/188
5,324,087 A * 6/1994 Shimose ................ B65G 47/91
294/185

(Continued)

FOREIGN PATENT DOCUMENTS

EP 2874217 A1 5/2015
JP 2002370245 A 12/2002

(Continued)

*Primary Examiner* — Stewart Fraser
(74) *Attorney, Agent, or Firm* — Young Basile Hanlon & MacFarlane, P.C.

(57) ABSTRACT

A holding apparatus for a fuel cell gasket has a support having a flat surface part which attracts the gasket and serves to stack a frame-shaped gasket on an outer circumference of an electrolyte membrane or a gas diffusion layer constituting a membrane electrode assembly on which a catalyst layer is disposed. The flat surface part has a frame-shaped recess corresponding to a shape of the gasket, and the recess is connected to an air-sucking section, with the gasket attracted by sucking air in the recess.

7 Claims, 8 Drawing Sheets

(51) Int. Cl.
*H01M 8/00* (2016.01)
*H01M 8/10* (2016.01)

(52) U.S. Cl.
CPC ....... *H01M 2008/1095* (2013.01); *Y02E 60/50* (2013.01); *Y02P 70/56* (2015.11)

(56) References Cited

U.S. PATENT DOCUMENTS 6,032,997 A * 3/2000 Elliott .................. B25B 11/005
269/21

6,341,808 B1 * 1/2002 Baan ..................... B25B 11/005
294/186
2010/0024957 A1 2/2010 Puffer et al.
2015/0165627 A1 * 6/2015 Ono ...................... H01M 8/006
294/185

FOREIGN PATENT DOCUMENTS

JP 2004235089 A 8/2004
JP 2010238655 A 10/2010

* cited by examiner

HOLDING APPARATUS FOR FUEL CELL GASKET

CROSS REFERENCE TO RELATED APPLICATION

The present application claims priority to Japanese Patent Application No. 2012-154955, filed Jul. 10, 2012, incorporated herein in its entirety.

TECHNICAL FIELD

The present invention relates to a holding apparatus for fuel cell gasket.

BACKGROUND

A membrane electrode assembly (MEA) included in a unit cell of a fuel cell has an electrolyte membrane, a catalyst layer, a gas diffusion layer, and a frame-shaped gasket. The gasket is stacked on both surfaces of the electrolyte membrane, positioned to surround the catalyst layer, and thus functions to prevent a fuel gas and an oxidizer gas supplied to the catalyst layer from leaking externally.

The gasket is attracted to a support in which many attracting holes are formed when the gasket is stacked on the electrolyte membrane or the gas diffusion layer, and thus formation of wrinkles in the gasket is prevented, and wrinkles in the gasket is suppressed from being transferred to the electrolyte membrane or the gas diffusion layer (for example, see Publication of unexamined Japanese Patent Application No. 2010-238655).

SUMMARY

However, at this time, there is a concern that contamination occurs as a result of that the attracting holes of the support suck catalyst particles being detached from the catalyst layer that is disposed on the electrolyte membrane or the gas diffusion layer, and clogging occurs in the many attracting holes. As a result, there is a problem that production efficiency is reduced.

The present invention has been made to solve the aforementioned problem in the prior art, and aims to provide a holding apparatus for fuel cell gasket capable of having high production efficiency.

The present invention to achieve the abovementioned object is a holding apparatus for fuel cell gasket that serves to stack a frame-shaped gasket on an outer circumference of an electrolyte membrane or a gas diffusion layer that constitutes a membrane electrode assembly of a fuel cell, and on which a catalyst layer is disposed, and includes a support including a flat surface part which attracts the gasket. The flat surface part has a frame-shaped recess corresponding to a shape of the gasket, and the recess is connected to an air-sucking section, and the gasket is attracted by sucking air in said recess.

According to the present invention, the gasket is attracted to the recess disposed in the flat surface part of the support, and thus formation of wrinkles in the gasket is prevented, and wrinkles in the gasket is suppressed from being transferred to an outer circumference of the electrolyte membrane or the gas diffusion layer. Further, the gasket is attracted to the frame-shaped recess and thus it is possible to suppress the occurrence of clogging and to suppress a reduction in production efficiency. Accordingly, it is possible to provide a holding apparatus for fuel cell gasket capable of having high production efficiency.

The objects, features, and characteristics of this invention other than those set forth above will become apparent from the description given herein below with reference to preferred embodiments illustrated in the accompanying drawings.

DETAILED DESCRIPTION OF THE EMBODIMENTS

Hereinafter, embodiments of the present invention will be described with reference to the drawings.

Figure 1:
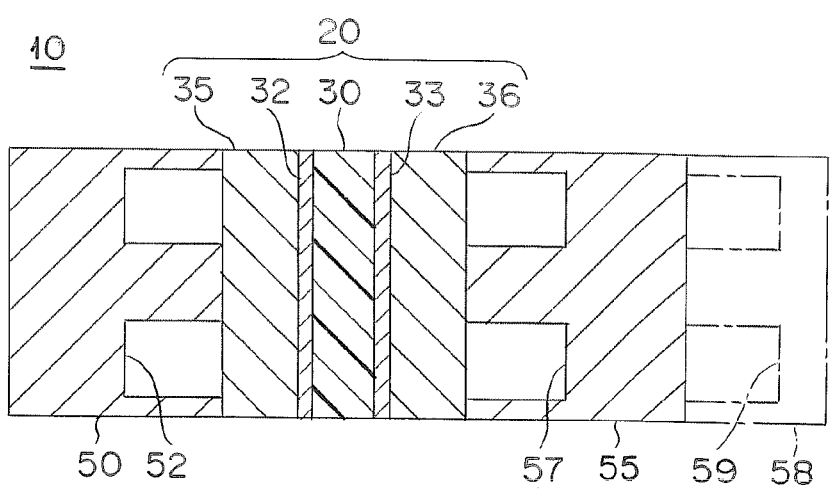
FIG. 1 is a cross-sectional view illustrating a cell structure of a fuel cell according to Embodiment 1.
Figure 2:
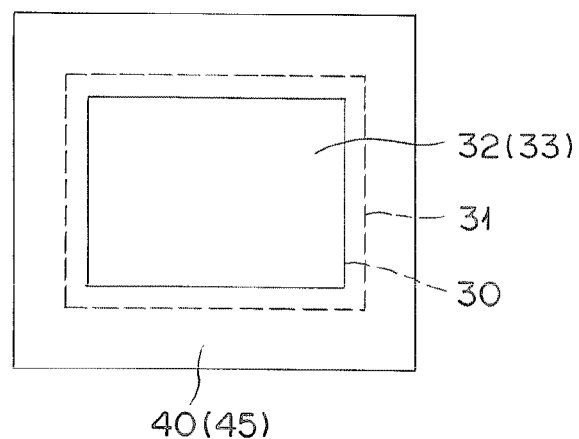
FIG. 2 is a plan view illustrating a gasket disposed on both surfaces of an outer circumference portion of a membrane electrode assembly shown in FIG. 1.

FIG. 1 is a cross-sectional view illustrating a cell structure of a fuel cell according to Embodiment 1, and FIG. 2 is a plan view illustrating a gasket disposed on both surfaces of an outer circumference portion of a membrane electrode assembly shown in FIG. 1.

A unit cell 10 shown in FIG. 1 is applied to, for example, a polymer electrolyte fuel cell (PEFC) which uses hydrogen as a fuel, and includes a membrane electrode assembly 20 and separators 50 and 55. The unit cell 10 further includes a cooling panel 58 in a case where the unit cells 10 are stacked to be used, and a recess 59 provided in the cooling panel 58 constitutes a coolant passage through which the coolant flows to cool the unit cell 10.

The membrane electrode assembly 20 includes a polymer electrolyte membrane 30, catalyst layers 32 and 33, gas diffusion layers (GDL) 35 and 36, and gaskets 40 and 45.

The catalyst layer 32 includes a catalyst component, electrically conductive catalyst carriers which carry the catalyst component, and a polymer electrolyte, and is an anode catalyst layer in which oxidation of hydrogen progresses, and is disposed on one side of the polymer electrolyte membrane 30. The catalyst layer 33 includes a catalyst component, electrically conductive catalyst carriers which carry the catalyst component, and a polymer electrolyte, is a cathode catalyst layer in which reduction of oxygen progresses, and is disposed on the other side of the polymer electrolyte membrane 30.

The polymer electrolyte membrane 30 functions to cause protons generated in the catalyst layer 32 to be selectively transmitted to the catalyst layer 33, and functions as a barrier wall to separate a fuel gas supplied to an anode side thereof and an oxidizer gas supplied to a cathode side thereof.

The gas diffusion layer 35 is an anode gas diffusion layer serving to diffuse the fuel gas supplied to the anode side and is positioned between the separator 50 and the catalyst layer 32. The gas diffusion layer 36 is a cathode gas diffusion layer serving to diffuse the oxidizer gas supplied to the cathode side and is positioned between the separator 55 and the catalyst layer 33.

The gaskets 40 and 45 are frame-shaped and disposed respectively on both surfaces of an outer circumference portion of the polymer electrolyte membrane 30, as shown in FIG. 2. The gasket 40 is positioned to surround the catalyst layer 32, and functions to prevent the fuel gas supplied to the catalyst layer 32 from leaking externally. The gasket 45 is positioned to surround the catalyst layer 33, and functions to prevent the oxidizer gas supplied to the catalyst layer 33 from leaking externally.

The separators 50 and 55 function to electrically connect the unit cells 10 to each other in series and function as a barrier wall to separate the fuel gas, the oxidizer gas, and the coolant from each other, and they have substantially the same shape as the membrane electrode assembly 20, and for example, are formed by press working a stainless steel sheet. The stainless steel sheet is preferable in that a complicated machine work is easily performed and electrical conductivity is high, and a coating for corrosion resistance may be applied to it, as necessary.

The separator 50 is an anode separator disposed on the anode side of the membrane electrode assembly 20, faces the catalyst layer 32, and has a recess 52 constituting a gas passage which is positioned between the membrane electrode assembly 20 and the separator 50. The recess (gas passage) 52 is used for supplying the fuel gas to the catalyst layer 32.

The separator 55 is a cathode separator disposed on the cathode side of the membrane electrode assembly 20, faces the catalyst layer 33, and has a recess 57 constituting a gas passage which is positioned between the membrane electrode assembly 20 and the separator 55. The recess (gas passage) 57 is used for supplying the oxidizer gas to the catalyst layer 33.

Next, the material, the size, and the like of each constituent member will be described in detail.

As the polymer electrolyte membrane 30, a fluorine system polymer electrolyte membrane constituted by a perfluoro carbon sulfonic acid-based polymer, a hydrocarbon-based resin film having a sulfonic acid group, and a porous film which is impregnated with an electrolyte component such as phosphoric acid or ionic liquid may be applied. The perfluoro carbon sulfonic acid-based polymer may be Nafion (trademark, product made by Dupont Co., Ltd.), Aciplex (trademark, product made by Ashahi Kasei Co., Ltd.), or Flemion (trademark, product made by Ashahi Glass Co., Ltd.), for example. The porous film is formed from polytetrafluoroethylene (PTFE) or polyvinylidene fluoride (PVDF).

The thickness of the polymer electrolyte membrane 30 is not particularly limited, but preferably in a range of 5 μm to 300 and more preferably in a range of 10 μm to 200 in view of strength, durability, and output characteristics.

The catalyst component used in the catalyst layer (cathode catalyst layer) 35 is not particularly limited as long as the catalyst component performs catalytic action in the reduction of oxygen. The catalyst component used in the catalyst layer (anode catalyst layer) 34 is not particularly limited as long as the catalyst component has catalytic action in the oxidation of hydrogen.

The specific catalyst component is selected from metals such as platinum, ruthenium, iridium, rhodium, palladium, osmium, tungsten, lead, iron, chrome, cobalt, nickel, manganese, vanadium, molybdenum, gallium, and aluminum, or alloys thereof, for example. The catalyst component preferably includes at least platinum in order to improve catalytic activity, poisoning resistance to carbon monoxide and the like, thermal resistance, and the like. It is not necessary that the catalyst components applied in the cathode catalyst layer and the anode catalyst layer be the same, and the catalyst components may be appropriately differentiated.

The electrically conductive catalyst carrier used in the catalyst layers 32 and 33 is not particularly limited as long as the electrically conductive catalyst carrier has a specific surface area for carrying the catalyst component in a desired diffusion state, and sufficient electron conductivity as a current collector, but the main component is preferably carbon particles. The carbon particles are formed from carbon black, activated carbon, coke, natural graphite, or artificial graphite, for example.

The polymer electrolyte used in the catalyst layers 32 and 33 is not particularly limited as long as the polymer electrolyte is a material which has at least high proton conductivity, and for example, a fluorine-based electrolyte including fluorine atoms in the entirety or a part of a polymer skeleton, or a hydrocarbon-based electrolyte not including fluorine atoms in a polymer skeleton may be applied. The polymer electrolyte used in the catalyst layers 32 and 33 may be the same as or different from a polymer electrolyte used in the polymer electrolyte membrane 30, but preferably the same in view of improving adhesion of the catalyst layers 32 and 33 to the polymer electrolyte membrane 30.

The gas diffusion layers 35 and 36 are formed by using as a base a sheet-shaped material which has electrical conductivity and a porous property such as a carbon-made textile such as a glassy carbon, a sheet-like paper body, felt, or non-woven fabric. The thickness of the base is not particularly limited, but preferably in a range of 30 μm to 500 μm in view of mechanical strength and permeability to gas, water, or the like. In the gas diffusion layers 35 and 36, the base preferably includes a water repellent in view of water repellency and suppression of the flooding phenomenon. The water repellent may be, for example, a fluorine-based polymer material such as PTFE, PVDF, polyhexafluoropropylene, or tetrafluoroethylene-hexafluoropropylene copolymer (FEP), and polypropylene, polyethylene.

The gaskets 40 and 45 are formed from rubber material, a fluorine-based polymer material, or thermoplastic resin, for example. The rubber material may be fluorine rubber, silicon rubber, ethylene propylene rubber (EPDM), polyisobutylene rubber, or the like. The fluorine-based polymer material may be PTFE, PVDF, polyhexafluoropropylene, FEP, or the like. The thermoplastic resin may be polyolefin or polyester. Polyester may be, for example, polyethylene naphthalate (PEN). The thickness of the gaskets 40 and 45 is not particularly limited, but preferably in a range of 50 μm to 2 mm, and more preferably in a range of 100 μm to 1 mm.

The separators 50 and 55 are not limited to the embodiment formed from stainless steel, and other metal materials (for example, aluminum or clad material) and carbon such as dense carbon graphite are also applicable. Recesses 52 and 72 may be formed by means of, for example, a cutting process in a case where carbon is applied.

Next, a holding apparatus which is applied in order to dispose the gasket on the polymer electrolyte membrane will be described.

Figure 3:
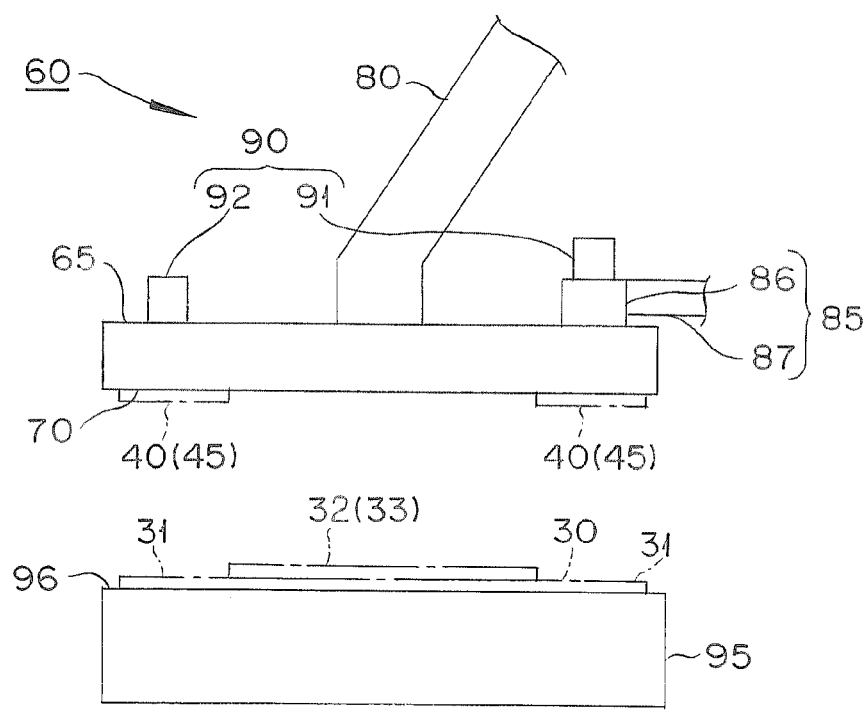
FIG. 3 is a side view illustrating a holding apparatus for the fuel cell gasket according to Embodiment 1.
Figure 4:
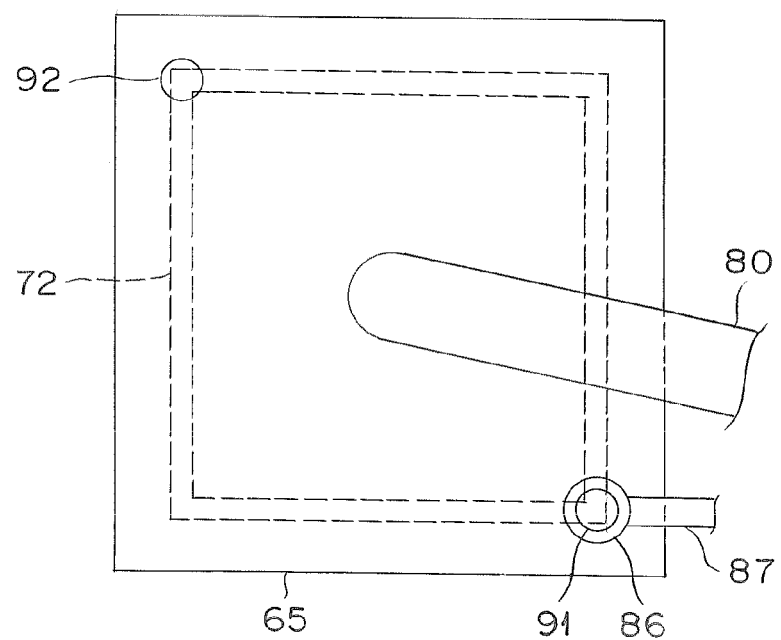
FIG. 4 is a plan view illustrating a support shown in FIG. 3.
Figure 5:
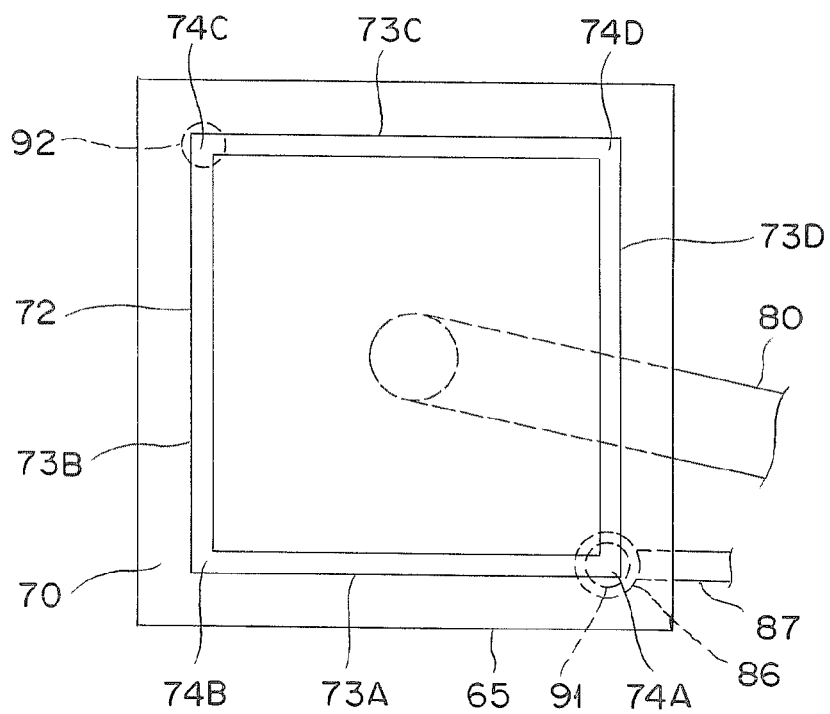
FIG. 5 is a bottom view illustrating the support shown in FIG. 3.
Figure 6:
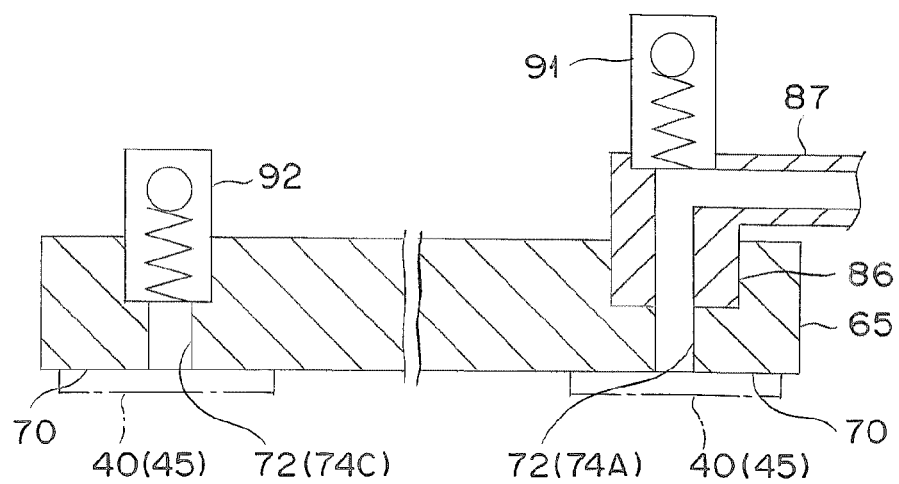
FIG. 6 is a cross-sectional view illustrating the support shown in FIG. 3.
Figure 7:
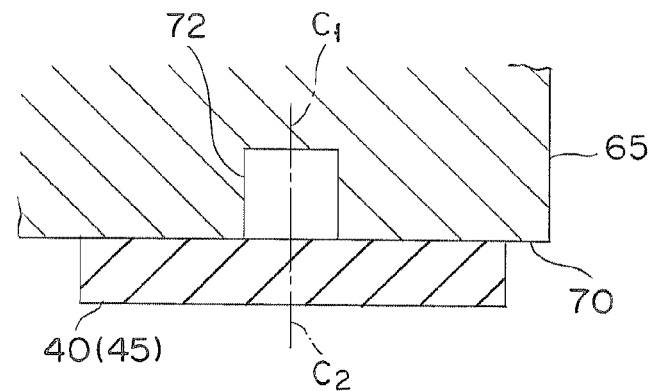
FIG. 7 is a cross-sectional view illustrating a recess shown in FIG. 5.

FIG. 3 is a side view illustrating a holding apparatus for fuel cell gasket according to Embodiment 1 and FIGS. 4, 5 and 6 are a plan view, a bottom view, and a cross-sectional view respectively illustrating a support shown in FIG. 3, and FIG. 7 is a cross-sectional view illustrating the recess shown in FIG. 5.

The holding apparatus 60 shown in FIG. 3 includes a support 65, a transport device 80, an air-sucking section 85, and a clogging detecting device 90.

The support 65 has a flat surface part 70 which attracts the gasket 40 (45) as shown in FIG. 5. The flat surface part 70 has a recess 72 connected to the air-sucking section 85.

The recess 72 has an inverted U-shaped cross-section (see FIG. 7), and is in a frame shape which has straight portions 73A to 73D and bent portions 74A to 74D, and the shape thereof corresponds to the shape of the gasket 40 (45), and is configured in such a manner that the gasket 40 (45) is attracted by sucking air in the recess 72. The center $C_1$ of the recess 72 in the width direction thereof is positioned to match the center $C_2$ of the gasket 40 (45), which is attracted to the flat surface part 70, in the width direction thereof, as shown in FIG. 7. Accordingly, even though the gasket is displaced, an influence due to the displacement is minimized, and distorted deformation of the gasket due to suction of the recess is suppressed.

The transport device 80 is composed of a multi-axis robot hand, for example, and used for transporting the support 65 such that the gasket 40 (45) is stacked on an outer circumference 31 of the polymer electrolyte membrane 30 on which the catalyst layer 32 (33) is disposed. The polymer electrolyte membrane 30 is disposed on a flat surface part 96 of a fixed type mounting table 95, for example. In this case, the gasket is easily positioned, compared with an embodiment in which the mounting table 95 is moving. The flat surface part 96 is formed from, for example, a porous member, connected to an external vacuum source (not illustrated), and thus is adapted to be able to suck the polymer electrolyte membrane 30.

The gasket 40 (45) is attracted to the recess 72 that is disposed in the flat surface part 70 of the support 65, and transported, as described above. Accordingly, formation of wrinkles in the gasket 40 (45) is prevented, and wrinkles in the gasket 40 (45) is suppressed from being transferred to the outer circumference 31 of the polymer electrolyte membrane 30. Since the recess 72 is in a frame shape, even though the catalyst particles detached from the catalyst layer 32 (33) disposed on the polymer electrolyte membrane 30 are sucked and then contamination occurs when the gasket 40 (45) is stacked on the outer circumference 31 of the polymer electrolyte membrane 30, the gasket is not attracted by means of the suction holes, and thus clogging is suppressed, and a reduction in production efficiency is prevented, compared with an embodiment in which a porous substrate (attracting holes) having a possibility that clogging occurs in many suction holes is used. Accordingly, it is possible to provide the holding apparatus 60 for fuel cell gasket capable of having high production efficiency.

Suction by the recess 72 is also preferable in that a suction pressure is released instantaneously, compared with a case where suction is performed through the porous substrate having many suction holes, and thus it is possible to improve production efficiency. Furthermore, even though suction by the recess 72 generates the contamination due to suction of particulates floating in the atmosphere, particulates adhering to the gasket 40 (45), and the like, the occurrence of clogging is also suppressed.

The transport device 80 is not limited to the embodiment in which the multi-axis robot hand is used, and for example, may be configured by combining a plurality of linear actuators. In this case, a driving source is preferably a servo motor which has good controllability and is electrically synchronization-controlled. The transport device 80 may also be omitted by providing the mounting table 95 with a transport device. In this case, by the transport device provided in the mounting table 95, the mounting table 95 is transported toward the gasket 40 (45) attracted to the support 65 which is fixedly disposed, and then the mounting table 95 is positioned such that the gasket 40 (45) is stacked on the outer circumference 31 of the polymer electrolyte membrane 30 disposed on the flat surface part 96 of the mounting table 95.

The air-sucking section 85 includes a manifold 86 and a piping system 87, as shown in FIGS. 4 to 6. The manifold 86 is composed of, for example, the suction valve, and is positioned at the bent portion 74A of the recess 72, and communicates with the recess 72.

The recess 72 has an inverted U shape (see FIG. 7) in cross section, and thus the manifold 86 can be easily connected thereto. Since the recess 72 is in a frame shape although the manifold 86 (air-sucking section 85) is disposed in the bent portion 74A of the recess 72, resistance at sucking air decreases, and fluctuation in pressure at attracting the gasket 40 (45) decreases. Accordingly, formation of wrinkles in the gasket 40 (45) is further suppressed.

The clogging detecting device 90 includes differential pressure gauges 91 and 92, as clearly shown in FIG. 6. The differential pressure gauges 91 and 92 are, for example, an elastic element type and are used for detecting pressure when the air-sucking section 85 (manifold 86 and piping system 87) sucks air. The differential pressure gauge 91 is disposed over the manifold 86, and the differential pressure gauge 92 is disposed on the bent portion 74C which is positioned on a diagonal line of the differential pressure gauge 91.

Accordingly, in a case where a partial clogging occurs in an air passage, pressure loss is caused at a clogged part at the time of pressure fluctuation, and a response to the pressure fluctuation is delayed. Thus, a time zone in which detection values of the differential pressure gauges 91 and 92 become different is generated. That is, pressure variation due to clogging of the recess 72 can be detected based on the detection values of the differential pressure gauges 91 and 92, and thus it is possible to detect clogging of the recess 72 at an early stage.

For example, at the time of starting suction, it is determined that the manifold 86 is in a normal state and the clogging does not occur when differential pressure does not occur in either of the differential pressure gauges 91 and 92, and it is determined that the clogging occurs in the manifold 86 when differential pressure occurs in only the differential pressure gauge 91. In a time period when the gasket 40 (45) is sucked and held, it is determined that the recess 72 is in a normal state when differential pressure occurs in both the differential pressure gauges 91 and 92, and it is determined that the clogging occurs in the recess 72 when differential pressure occurs in only the differential pressure gauge 91. At the time when suction of the gasket 40 (45) is stopped and released, and the gasket 40 (45) is stacked and attached, it is determined that the recess 72 and the manifold 86 are in a normal state, and the clogging does not occur when differential pressure does not occur in either of the differential pressure gauges 91 and 92, and it is determined that the clogging occurs in the recess 72 when differential pressure occurs in the differential pressure gauge 91, and it is determined that the clogging occurs in the manifold 86 when differential pressure occurs in the differential pressure gauge 92.

Since the recess 72 is in a frame shape, locations where the clogging easily occurs are the bent portions 74B and 74D. However, when the clogging occurs in one of the bent portions 74B and 74D, a passage in the other of the bent portions 74B and 74D functions as a bypass passage, and thus poor attraction (poor holding) of the gasket 40 (45) is suppressed. When the clogging occurs in both the bent portions 74B and 74D, it is possible to rapidly determine clogging at an early stage by using the differential pressure gauges 91 and 92.

In the embodiment in which the porous substrate (attracting holes) having many suction holes is used, it is needed that the number of pressure detecting devices corresponds to the number of the suction holes when the clogging is detected with respect to each suction hole, but installation of the pressure detecting devices is impossible considering the size of the gasket 40 (45). Even if the installation is performed, the devices become complex, and maintenance control becomes complex. When cloggings in many suction holes are collectively detected by the pressure detecting device over the upstream part of the manifold, there is a concern that partial clogging cannot be appropriately detected. Meanwhile, a suction line of air according to Embodiment 1 is preferable in that malfunction due to clogging of the recess 72 will not be missed because the suction line of air is formed from the recess 72, and partial clogging is unlikely to be caused, and the suction line of air is adapted to detect an abnormality in the recess 72 with the necessary minimum number of devices, that is, two devices. The sucking force (holding force) of the support 65 as a holding jig to the gasket 40 (45) is desired to be smaller than the deformation stress of the gasket 40 (45), and a plurality of the recesses may be provided, but stress due to suction in at least one of the recesses is desirable to be smaller than the deformation stress of the gasket 40 (45) in an inward direction of the recess.

Figure 8:
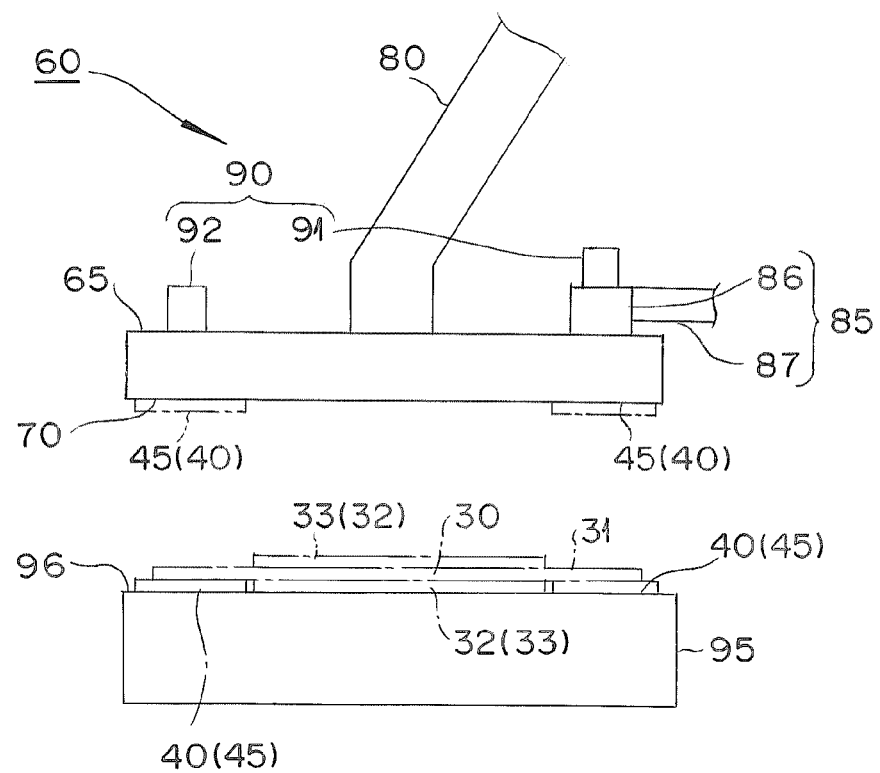
FIG. 8 is a side view illustrating Modification 1 according to Embodiment 1.

FIG. 8 is a side view illustrating Modification 1 according to Embodiment 1. The polymer electrolyte membrane 30 disposed on the flat surface part 96 of the mounting table 95 is not limited to the embodiment in which the catalyst layer is disposed on only the surface thereof. For example, as shown in FIG. 8, the polymer electrolyte membrane 30 having the catalyst layer 32 (33) and the gasket 40 (45) disposed on one surface thereof facing the flat surface part 96 of mounting table 95, and the catalyst layer 33 (32) disposed on the other surface thereof is applicable. In this case, the gasket 45 (40) is stacked on the outer circumference 31 of the polymer electrolyte membrane 30.

Figure 9:
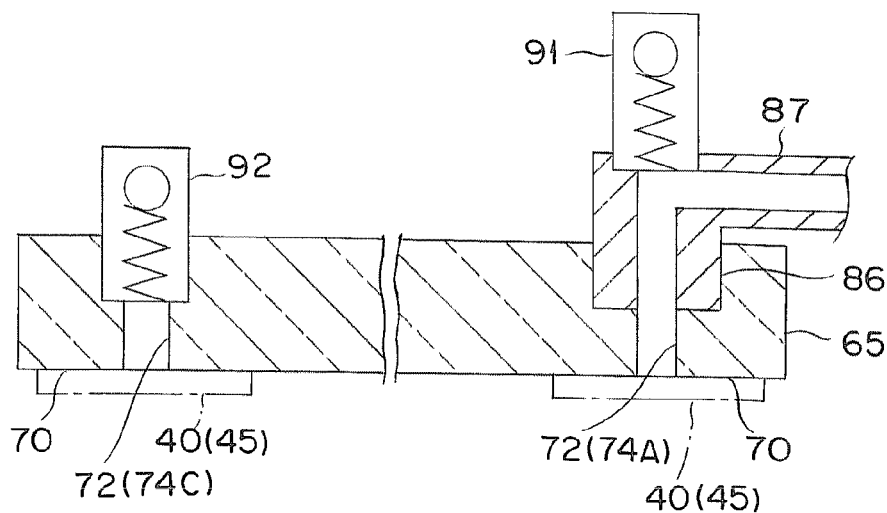
FIG. 9 is a cross-sectional view illustrating Modification 2 according to Embodiment 1.

FIG. 9 is a cross-sectional view illustrating Modification 2 according to Embodiment 1. The support 65 is preferably formed from an optically transparent material as shown in FIG. 9. The optically transparent material is acrylic resin, for example.

In this case, states of the recess 72, the gasket 40 (45), the polymer electrolyte membrane 30, and the catalyst layer 32 (33) may be optically detected. Accordingly, it is possible to easily detect a clogging location by visually observing a state of the outer circumference of the polymer electrolyte membrane 30 (situation of attraction), for example. Since the positions of the gasket 40 (45), the polymer electrolyte membrane 30 and the catalyst layer 32 (33) can be visually confirmed, positioning depending on perception of an operator is unnecessary, and reliability is improved. Furthermore, for example, it is possible to confirm the position by using an infrared sensor, and facilities are easily automated (used as a constituent of production facilities) based on the work by the robot or the like.

Figure 10:
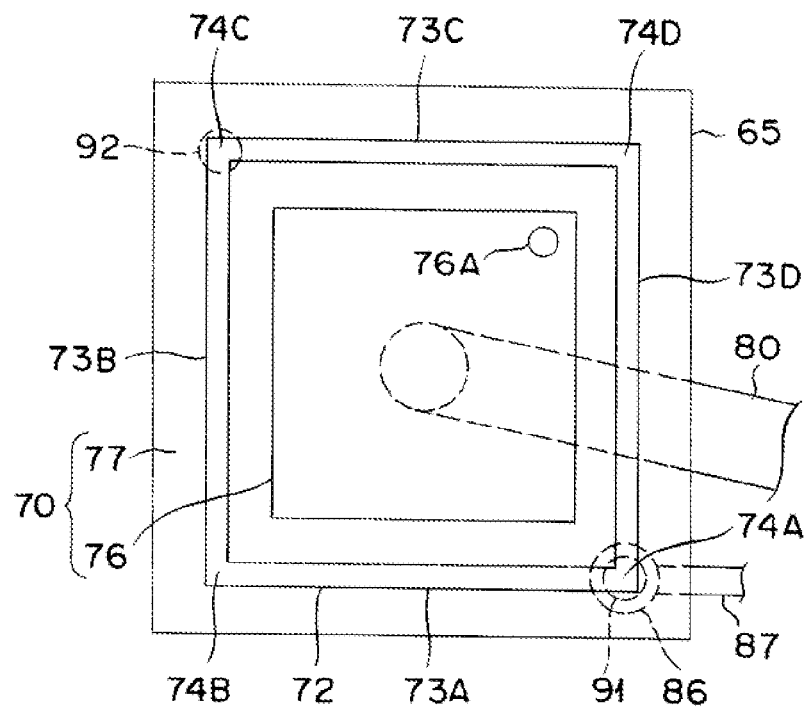
FIG. 10 is a rear view illustrating Modification 3 according to Embodiment 1.
Figure 11:
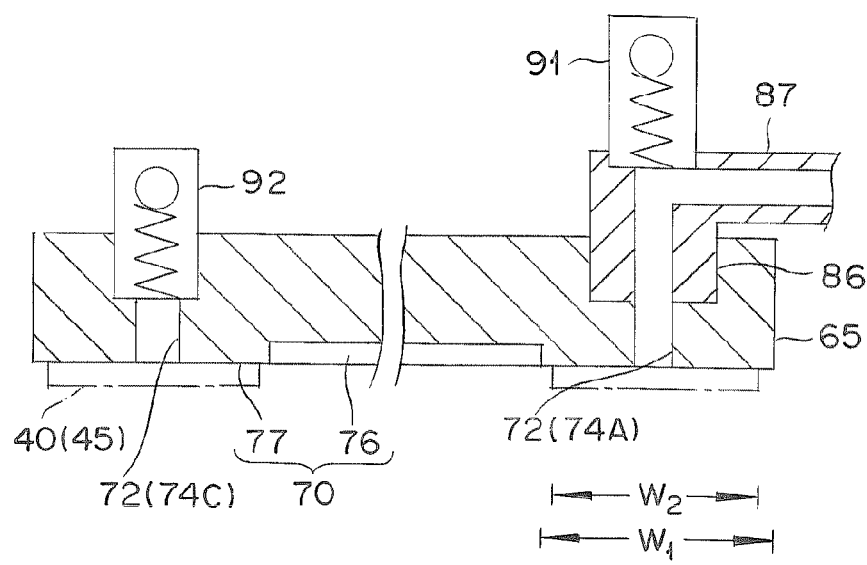
FIG. 11 is a cross-sectional view illustrating Modification 3 according to Embodiment 1.

FIGS. 10 and 11 are a rear view and a cross-sectional view illustrating Modification 3 according to Embodiment 1.

The support 65 is preferably prevented from coming into contact with the catalyst layer 32 (33) in order to avoid contamination from the catalyst layer 32 (33). This can be dealt with in such a manner that a depressed portion 76 is disposed on the flat surface part 70 of the support 65 as shown in FIGS. 10 and 11. The depressed portion 76 has a substantially rectangular shape corresponding to a planar shape of the catalyst layer 32 (33), and the depth thereof matches the thickness of the catalyst layer 32 (33). A frame-shaped portion 77 is disposed around the depressed portion 76. The recess 72 is disposed in the frame-shaped portion 77, and the frame-shaped portion 77 constitutes an attracting surface of the gasket 40 (45). A through hole 76A may be provided in the depressed portion 76 in order to release the air when the gasket 40(45) on the support 65 as the holding jig approaches the polymer electrolyte membrane so as to come into contact with the polymer electrolyte membrane.

The width $W_1$ of the frame-shaped portion 77 is set in order not to be smaller than the width $W_2$ of the gasket 40 (45). Accordingly, the frame-shaped portion 77 is capable of pressing the gasket 40 (45) on the surface thereof, and entrainment of air bubbles based on the poor attraction of the gasket 40 (45) is suppressed. When the width $W_1$ of the frame-shaped portion 77 is the same as the width $W_2$ of the gasket 40 (45), the effect is obtained that positioning is easily performed when the gasket 40 (45) is attracted and picked up. The manifold 86 is preferably provided so as not to interfere with the depressed portion 76.

Figure 12:
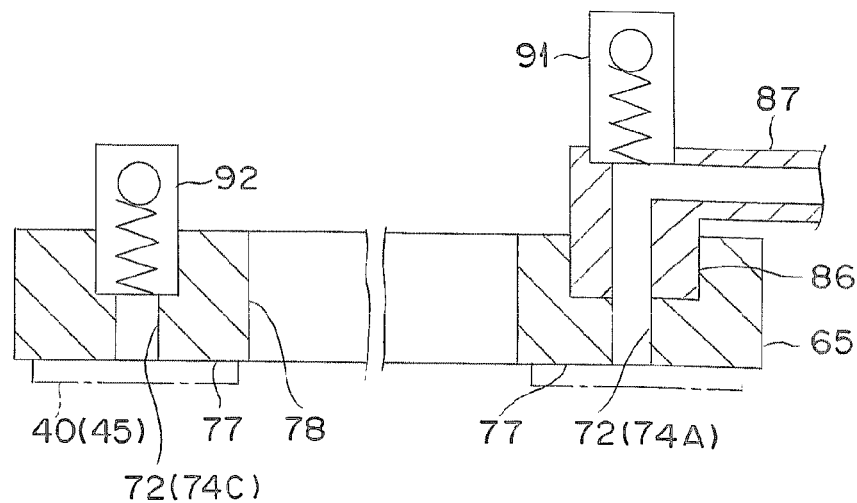
FIG. 12 is a cross-sectional view illustrating Modification 4 according to Embodiment 1.

FIG. 12 is a cross-sectional view illustrating Modification 4 according to Embodiment 1. The suppression of contamination from the catalyst layer 32 (33) is not limited to the embodiment in which the depressed portion 76 is used, and dealt with in such a manner that, for example, a substantially rectangular opening 78 corresponding to the planar shape of the catalyst layer 32 (33) is disposed on the flat surface part 70 of the support 65 instead of the depressed portion 76.

Figure 13:
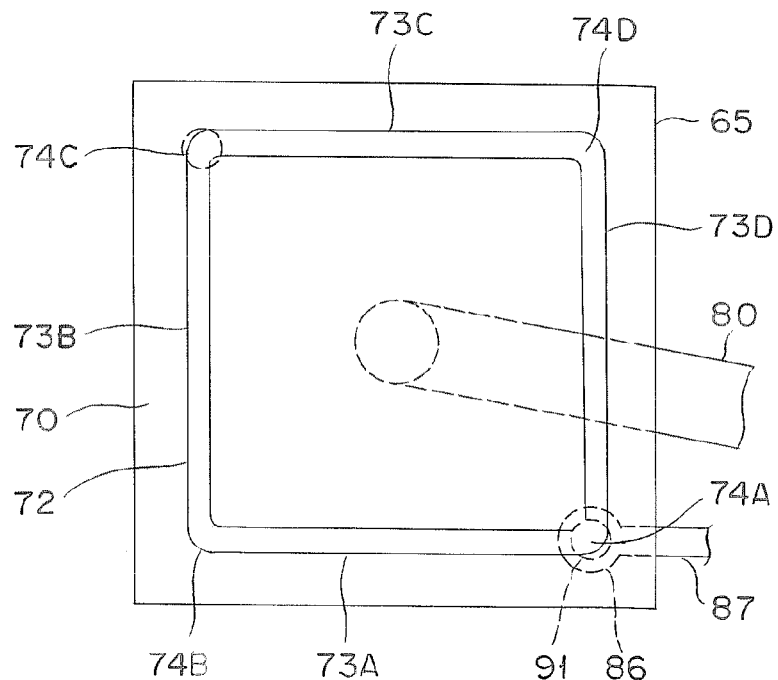
FIG. 13 is a rear view illustrating Modification 5 according to Embodiment 1.

FIG. 13 is a rear view illustrating Modification 5 according to Embodiment 1. The bent portions 74A to 74D of the recess 72 are not limited to a substantially square shape and may have a curved shape which is gradually bent. In this case, air flows smoothly in the bent portions 74A to 74D, and thus resistance at sucking air decreases.

As described above, in Embodiment 1, since the gasket is attracted to the recess disposed on the flat surface part of the support, formation of wrinkles in the gasket is prevented, and wrinkles of the gasket is suppressed from being transferred to the outer circumference of the polymer electrolyte membrane. Further, the gasket is attracted to the frame-shaped recess and thus it is possible to suppress the occurrence of clogging and to suppress a reduction in production efficiency. Accordingly, it is possible to provide a holding apparatus for fuel cell gasket capable of having high production efficiency.

The recess is in a frame shape, but the manifold (air-sucking section) is disposed in the bent portion of the recess, and resistance at sucking air decreases, and fluctuation in pressure at attracting the gasket decreases, and accordingly, formation of wrinkles in the gasket is further suppressed.

When the support is formed from an optically transparent material, states of the recess, the gasket, the polymer electrolyte membrane, and the catalyst layer may be visually detected. Accordingly, it is possible to easily detect a clogging location by visually observing a state of the outer circumference of the polymer electrolyte membrane (situation of attraction), for example. Since the positions of the gasket, the polymer electrolyte membrane and the catalyst layer can be visually confirmed, positioning depending on perception of an operator is unnecessary, and reliability is improved. Furthermore, for example, it is possible to confirm the position by using an infrared sensor, and facilities are easily automated (used as a constituent of production facilities) based on the work by the robot or the like.

In a case with the detecting device which detects pressure at sucking air, pressure variation due to the clogging of the recess can be detected, and thus it is possible to detect the clogging of the recess at an early stage.

When the center of the recess in the width direction thereof is positioned to match the center of the gasket, which is attracted to the flat surface part, in the width direction thereof, even though the gasket is displaced, an influence due to the displacement is minimized, and distorted deformation of the gasket due to suction of the recess is suppressed.

When the recess has an inverted U shape in cross section, it is possible to be easily connected to the manifold (air-sucking section).

In a case with the transport device which transports the support, positioning of the gasket is easily performed, compared with a case where the mounting table with the flat surface part on which the electrolyte membrane is disposed is transported.

Figure 14:
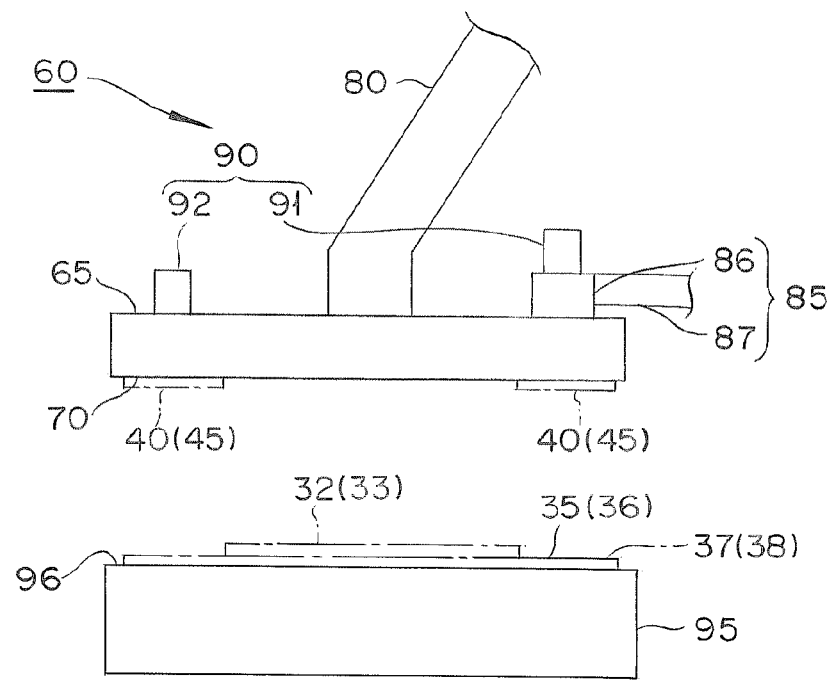
FIG. 14 is a side view illustrating Embodiment 2.
Figure 15:
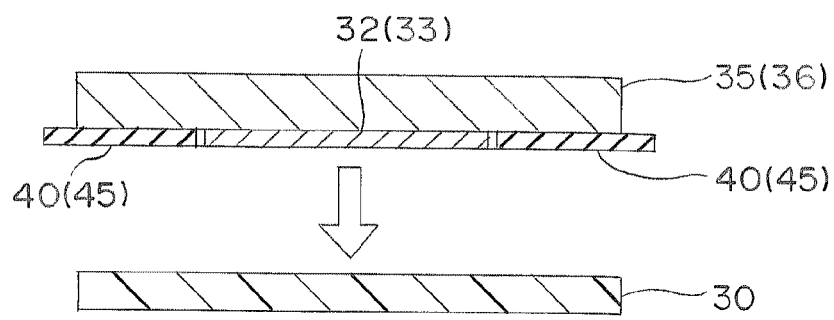
FIG. 15 is a cross-sectional view illustrating Embodiment 2.

Next, Embodiment 2 will be described. FIGS. 14 and 15 are a side view and a cross-sectional view illustrating Embodiment 2. Embodiment 2 is roughly different from Embodiment 1 in that a target on which the gasket 40(45) is stacked is the gas diffusion layer 35 (36).

The gas diffusion layer 35 (36) on which the catalyst layer 32 (33) is disposed is fixed to the flat surface part 96 of the mounting table 95 as shown in FIG. 14, and the transport device 80 transports the support 65 such that the gasket 40 (45) is stacked on an outer circumference 37 (38) of the gas diffusion layer 35 (36).

In this case, the gasket 40 (45) is attracted to the recess 72 disposed on the flat surface part 70 of the support 65 and transported, and thus formation of wrinkles in the gasket 40 (45) is prevented, and wrinkles in the gasket 40 (45) is suppressed from being transferred to the outer circumference 37 (38) of the gas diffusion layer 35 (36). Since the recess 72 is in a frame shape, and the gasket is not attracted by means of suction holes, even though the catalyst particles detached from the catalyst layer 32 (33) disposed on the gas diffusion layer 35 (36) are sucked and then contamination occurs when the gasket 40 (45) is stacked on the outer circumference 37 (38) of the gas diffusion layer 35 (36), the occurrence of clogging is suppressed and a reduction in production efficiency is prevented, compared with an embodiment in which a porous substrate (attracting holes) is used, and there is a concern that clogging occurs in the many suction holes.

The gas diffusion layer 35 (36) on which the gasket 40 (45) is stacked is to be reversed and then stacked on the polymer electrolyte membrane 30 as shown in FIG. 15.

As described above, in Embodiment 2, wrinkles in the gasket is suppressed from being transferred to the outer circumference of the gas diffusion layer, the occurrence of clogging is suppressed, and thus it is possible to suppress a reduction in production efficiency. Accordingly, it is possible to provide a holding apparatus for fuel cell gasket capable of having high production efficiency, similarly to a case of Embodiment 1.

The present invention is not limited to the above embodiment, but can be modified in various forms within the range of the claims. For example, the fuel cell may be composed of a polymer electrolyte fuel cell which uses methanol as a fuel, or may be applied as a stationary power source. The polymer electrolyte fuel cell which uses methanol as a fuel may be a direct methanol fuel cell (DMFC), a micro fuel cell (passive type DMFC), or the like. Ethanol, 1-propanol, 2-propanol, primary butanol, secondary butanol, tertiary butanol, dimethyl ether, diethyl ether, ethylene glycol, diethylene glycol, or the like may be applied as a material other than hydrogen and methanol.

The number of manifolds for communicating with the recess and sucking the air is not limited to one, and a plurality of manifolds may be disposed. The recess may be formed by a dual structure. Furthermore, Modification 2 to Modification 5 according to Embodiment 1 may be applied to Embodiment 2.

The invention claimed is:

1. A holding apparatus for disposing a fuel cell gasket which is to be stacked on an outer circumference of an electrolyte membrane or a gas diffusion layer which constitutes a membrane electrode assembly of a fuel cell and on which a catalyst layer is disposed, the gasket shaped to frame a shape of the outer circumference of the electrolyte membrane or the gas diffusion layer, the holding apparatus comprising:
   a support including a flat surface part which attracts the gasket,
   wherein the flat surface part has a recess connected to an air-sucking section, the recess formed as a single continuous channel in the flat surface part that is shaped to correspond to a shape of the gasket, the depth of the channel being less than a thickness of the support,
   wherein the gasket is attracted by sucking air in the recess.

2. The holding apparatus for fuel cell gasket according to claim 1, wherein the recess has a linear portion and a bent portion, the air-sucking section connected to the bent portion.

3. The holding apparatus for fuel cell gasket according to claim 1, wherein the support is formed from an optically transparent material.

4. The holding apparatus for fuel cell gasket according to claim 1, further comprising a detecting device which detects pressure when air is sucked by the air-sucking section.

5. The holding apparatus for fuel cell gasket according to claim 1, wherein a center of the channel in a width direction thereof is positioned to match a center of a corresponding frame portion of the gasket, which is attracted to the flat surface part, in a width direction thereof.

6. The holding apparatus for fuel cell gasket according to claim 1, wherein a cross-sectional shape of the channel is an inverted U shape.

7. The holding apparatus for fuel cell gasket according to claim 1, further comprising a transport device which transports the support and the gasket such that the gasket is stacked on the outer circumference of the electrolyte membrane or the gas diffusion layer.

* * * * *